United States Patent [19]

Okamoto

[11] Patent Number: 4,485,211

[45] Date of Patent: Nov. 27, 1984

[54] POLY(GLYCIDYL ETHER)BLOCK COPOLYMERS AND PROCESS FOR THEIR PREPARATION

[75] Inventor: Yoshihisa Okamoto, Sagamore Hills, Ohio

[73] Assignee: The B. F. Goodrich Company, Akron, Ohio

[21] Appl. No.: 418,341

[22] Filed: Sep. 15, 1982

[51] Int. Cl.³ .................... C08F 297/00; C08G 65/12
[52] U.S. Cl. ........................ 525/57; 525/56; 525/349; 525/379; 525/385; 525/409; 525/524
[58] Field of Search ............... 525/524, 409, 385, 349, 525/379, 56, 57

[56] References Cited

U.S. PATENT DOCUMENTS

| | | | |
|---|---|---|---|
| 3,029,216 | 4/1962 | Bailey et al. | 525/409 |
| 3,754,053 | 8/1973 | Kray et al. | 525/409 |
| 3,864,288 | 2/1975 | Riew et al. | 525/409 |
| 4,200,733 | 4/1980 | Perner et al. | 525/409 |
| 4,256,910 | 3/1981 | Hsu | 525/403 |
| 4,279,798 | 7/1981 | Aggarwal et al. | 525/385 |
| 4,360,451 | 11/1982 | Schmolka | 525/409 |

FOREIGN PATENT DOCUMENTS 638227  3/1962  Canada ................. 525/409

*Primary Examiner*—Allan M. Lieberman
*Attorney, Agent, or Firm*—Alfred D. Lobo; Nestor W. Shust

[57] ABSTRACT

Under particular conditions, a cationic ring-opening polymerization of a first oxirane monomer selected from the group consisting of an acyclic glycidyl ether, a cyclic glycidyl ether, and a haloalkyl epoxide, in the presence of a hydroxyl-containing organic material ("HCM"), for example a polymer (referred to herein as a 'hydroxyl-prepolymer'), and a particular catalyst, produces a polymerization having 'living polymerization' characteristics. The result is that molecular weight (mol wt) of the resulting polymer is directly proportional to the conversion of the monomer to said resulting polymer. This HCM serves as a chain propagator which initially furnishes OH groups as propagation sites. Subsequently, a second oxirane monomer, different from said first, is sequentially polymerized to yield a block copolymer. Branched block copolymers, or linear block copolymers of a HCM and (a) one or more glycidyl ethers, or (b) a haloalkyl epoxide and at least one glycidyl ether, may be prepared. Halogen containing segments of the block copolymers of the invention may be aminated to produce amphophilic polymers.

29 Claims, No Drawings

POLY(GLYCIDYL ETHER)BLOCK COPOLYMERS AND PROCESS FOR THEIR PREPARATION

BACKGROUND OF THE INVENTION

Advances in the art of preparing block copolymers (from two or more monomers) with clearly defined block lengths and narrowly defined controlled molecular weight (mol wt), substantially free from homopolymer residues, has provided the bases for a host of commercially significant polymers prepared by anionic polymerization. Such advances in the art of preparing block copolymers, it is generally acknowledged, are not known in the art of cationic ring-opening polymerization. With respect even to the general art of cationic polymerization, Prof. Joseph Kennedy said "Cationic polymerizations have only very recently emerged from the dark middle ages and reached the point where systematic tailoring of polymer structures became possible." (see *Isotopics*, pg 4, May 1982).

Specifically with respect to the cationic polymerization of ethylene oxide with $SnCl_4$, Worsfold and Eastham found that each $SnCl_4$ molecule rapidly initiates two polymer chains which slowly increase in length through stepwise addition of monomer. They observed that addition of monomer does not regenerate the reaction, and assumed termination to involve no transfer but rather destruction of the catalyst. See *High Polymers*, Vol. XIII, Part I, Polyalkylene Oxides and Other Polyethers, by Norman G. Gaylord, pg 113–114, Interscience Publishers, John Wiley & Sons, New York (1963). Thus, it would appear that there was a specific suggestion that block copolymers would not be formed by a living polymerization reaction with an acid catalyst or initiator, if the monomer had an ethylene oxide structure. By "living polymerization" I refer to one which is, for all practical purposes, free from transfer and termination reactions.

To one skilled in the art, the synthesis of polymers by cationic ring-opening polymerization and an assessment of the properties of block copolymers based on their structure, is bedded in theoretical considerations, which have been formulated with less conviction than those related to non-ring-opening cationic polymerizations, generally. An assessment of the probability that a little-understood process will provide a block copolymer with any particular structure and desirable properties such as stability, controllable block lengths and mol wt distributions, is even more theory-oriented, if not speculative.

Such theoretical considerations as the effect of reactivity ratios of monomers from which individual blocks of a particular block copolymer are formed, even if these ratios are determined in an analogous cationic polymerization system, is of no known relevance either with respect to the ease of formation of the particular block copolymers of my invention, or the particularity of their properties as a result of being derived by a specific cationic ring-opening polymerization.

The difficulty of tailoring block copolymers by cationic ring-opening polymerization so as to provide a mol wt within a narrow range and well-defined functionality is well known. Recently, novel block and graft copolymers based on the di- and multicationically ended living polyacetals and polyethers have been shown to be formed without a hydroxyl-containing material, and under anhydrous conditions. See *Cationic Ring-Opening Polymerization*, by Stanislaw Penczek, Polish Academy of Sciences, Center of Molecular and Macromolecular Studies, 90-362 Lodz, Poland; see *Makromol. Chem., Suppl.*, 3, 17–39 (1979). This work appears to confirm the teachings of the Dreyfuss U.S. Pat. No. 3,850,856 that OH groups would 'kill' the system, if it was a living one.

In view of the foregoing teachings, one unacquainted with the theory is more likely to consider the results of certain steps in a polymerization process quite easily accounted for, at least after the fact, than one who is more closely acquainted with the theory. Further, one skilled in the art would expect that properties of block copolymers will be different from those of random copolymers, but the difference in properties between certain block copolymers which superficially appear to be similar, may have a wholly different significance from differences in apparently similar random copolymers.

This invention is particularly directed to a process for making certain branched block copolymers, and linear block copolymers (all of which are herein referred to as 'block copolymers' for reasons which will presently be evident), using a hydroxyl-containing organic material (hereinafter "HCM", for brevity) as the chain propagator which furnishes OH groups as chain propagation sites; and, using preselected HCMs, for making graft, star and comb block copolymers; and, which process, relies upon a living polymerization generated by the catalytic action of a fluorinated acid catalyst having the formula $HMF_6$ wherein M is selected from phosphorus, arsenic and antimony; or, an oxonium salt of the acid. The process of my invention yields block copolymers which persons skilled in the art believed could not be made before the discovery of my process.

More specifically, the block copolymers of my invention are made by a living cationic ring-opening polymerization, and propagated at sites furnished by the HCM in the presence of a known catalyst disclosed in U.S. Pat. No. 3,585,227, and in U.S. Pat. No. 3,850,856, the disclosures of which are incorporated by reference herein as if fully set forth. The polymerization disclosed in the U.S. Pat. No. 3,850,856 was based on water, or ethylene glycol terminating the growing polymer chains by introducing OH groups at the terminal positions. This polymerization is now discovered to be a living polymerization which is quite surprising since it is well known that "The nature of the processes involved in cationic copolymerisations of monomer mixtures, and the experimental limitations which they impose, have made this synthetic route to block copolymers generally unsatisfactory, at least for most comonomer pairs." (see *Block Copolymers*, by Allport, D. C. and Janes, W. H., pg 354, John Wiley & Sons, 1973). Implicitly, this corroborates a prejudice against cationic living polymerization systems.

Further, since known polymers such as those described in the '856 patent are clearly stated to be hydroxyl-ended, the use of a HCM as a chain propagator which furnishes hydroxyl (OH) groups as chain propagation sites, was deemed to have been precluded. Thus, there was no motivation to explore the possibility that, even a hydroxyl-ended prepolymer might function as a chain propagator in the same manner as the HCM. Nevertheless, it has now been found that, under certain conditions, growth of block copolymers is propagated with a HCM, which growth occurs in a well-definable living polymerization system. More particularly, it now appears that the structure of the residue of the HCM chain propagator, whether monomeric or polymeric, of low molecular weight or high, does not adversely affect the growth of a block copolymer, but generates a living system able to grow preselected blocks, so that the overall polymer weight, the polymer segmental weight, and the polymer's functionality are each narrowly defined.

Epihalohydrin polymers formed by cationic polymerization with triethyloxonium hexafluorophosphate (TEOP) are known to be formed as disclosed in U.S. Pat. No. 3,850,857. However, neither the molecular weight of the polymers nor their functionality can be narrowly controlled, resulting in the loss of control of the polymers' properties. In contrast, the unexpectedly close control of molecular weight and functionality of the block copolymers of my invention facilitates the production of a variety of tailored block copolymers which are not only useful as film-formers, viscosity increasing agents, dispersing agents for polymerization, and the like, but also for mineral beneficiation where highly specific properties are essential to the making of sharp, and hence profitable, separations.

Such close control of mol wt and functionality is only possible because of the unqiue characteristics of a living polymerization found to be the key to the process, in which the mol wt of the polymer is increased directly with the amount of monomer converted to polymer.

Some two decades ago, it was known that hydroxyl group-containing compounds are condensed with epoxyalkyl halides in the presence of fluoboric catalysts as disclosed in U.S. Pat. No. 3,129,232. Soon thereafter it was shown in U.S. Pat. No. 3,305,565 that water is an initiator in the presence of various acid catalysts forming halo-hydroxyl terminated polymers which could be epoxidized. More recently, terminally unsaturated liquid epihalohydrin polymers have been disclosed in U.S. Pat. No. 4,256,910 which are relatively low in molecular weight, in which polymers a backbone is obtained by homopolymerizing an epihalohydrin, or forming random copolymers by copolymerizing two or more epihalohydrins, or copolymerizing an epihalohydrin with a vicinal epoxide, and using the same TEOP catalyst as used in the '856 process. It is clear that this teaching of combinations of a wide variety of monomeric alkylene ethers with an epihalohydrin refers to random copolymers and fails to indicate that a block copolymer might be formed under yet-to-be specified conditions. Neither is there any indication that the hydroxyalkyl(meth)acrylate used in the '910 patent functioned as a chain propagator, nor that the mol wt and functionality of the polymer were narrowly defined.

U.K. Patent Application No. 2,021,606A teaches that hydroxyl-terminated poly(chloroalkylene ethers) have not proven entirely satisfactory when prepared by cationic ring-opening polymerization as disclosed in U.S. Pat. Nos. 3,850,856; 3,910,878; 3,910,879; and, 3,980,579. Thus, the problems inherent in the use of prior art catalysts referred to in the foregoing U.S. patents have been documented. A solution to the problems was provided in the British patent application. This solution was to use a catalyst comprising (i) a fluorinated acid catalyst having the formula $H_mXF_{n+m}$ wherein X is selected from boron, phosphorus, arsenic and antimony, m is 0 or 1 and n is 3 when X is boron and n is 5 when X is phosphorus, arsenic and antimony, and, (ii) a polyvalent tin compound.

This British patent teaches that only tin fluorometallic compounds even among other Group IV metals, has a peculiar catalytic action not attributable to Group V fluorometallic compounds. The British catalyst permits water to provide hydroxyl-terminated polymers with the same structure as those polymers provided by other HCMs. No distinction is made between HCMs in which the residue is other than H, and one in which it is H (as it is when the HCM is water). It is disclosed that, with the specified tin fluorometallic compounds, the resulting polymers include random copolymers, and certain block copolymers. Whatever the mechanism of the polymerization reaction, it is clear that the difference in the overall polymer formed in the British invention is attributable to its use of a specific catalyst, namely, a fluorinated acid-polyvalent tin compound catalyst, rather than (say) the trialkyloxonium hexafluoro(Group V) metal, used in the '856 patent, and now found to be useful in the instant invention.

The quaternization ("amination") of polyepihalohydrins is known to yield highly water soluble products useful as coagulants, for example in the treatment of raw sewage, as disclosed in U.S. Pat. No. 3,591,520. However, as is well known, the amination of poly(epichlorohydrin) "PECH" does not proceed very easily, even under elevated pressure and temperature, with the result that only partial amination is generally achieved. Accordingly, it might be expected that a block copolymer having a glycidyl ether segment would not be easily aminated because of the solubility properties of the block copolymer. Thus it is quite unexpected that reactive halogens in a block copolymer of (i) a HCM, (ii) a polyepihalohydrin, and, (iii) at least one poly(glycidyl ether), should be substantially fully aminated, if so desired, despite the presence of segments which clearly do not lend themselves to amination in any known manner.

SUMMARY OF THE INVENTION

It has unexpectedly been found that, under particular conditions, a cationic ring-opening polymerization of a first oxirane monomer selected from the group consisting of an acrylic glycidyl ether, a cyclic glycidyl ether, and a haloalkyl epoxide, in the presence of a hydroxyl-containing organic material ("HCM"), for example a polymer (referred to herein as a 'hydroxylprepolymer'), and a particular catalyst, produces a polymerization having 'living polymerization' characteristics. The result is that molecular weight (mol wt) of the resulting polymer is directly proportional to the conversion of the monomer to said resulting polymer. This HCM serves as a chain propagator which initially furnishes OH groups as propagation sites. Though water is known to initiate catalytic polymerization of oxirane monomers, such polymerization with water results in copolymers of different structure from those prepared with organic hydroxyl-containing materials. Thus, for the purpose of this invention, water is not an HCM.

Subsequent to the polymerization of the first oxirane monomer, a second oxirane monomer, different from said first oxirane monomer, and additional plural oxirane monomers selected from said group, if desired, are sequentially polymerized to yield a block copolymer. Branched block copolymers, or linear block copolymers of a HCM and (a) one or more glycidyl ethers, or (b) a haloalkyl epoxide and at least one glycidyl ether, may be prepared such that the mol wt of the resulting polymer may be controlled by adjusting the ratio of oxirane monomer to HCM.

Essential requirements of this cationic ring-opening living polymerization of the aforespecified oxirane monomers have been found to be the use of (i) a catalytic amount of a catalyst (initiator) which may be either a fluorinated metallic acid catalyst having the formula $HMF_6$ wherein M is selected from phosphorus, arsenic and antimony; or, an oxonium salt of the acid; and, (ii) a HCM chain propagator which is at least partially soluble, and more preferably, is completely soluble in the reaction mass, with or without a solvent.

It is therefore a general object of this invention to provide a process for the manufacture of a poly(glycidyl ether) block copolymer, which process comprises, (i) polymerizing, in a first step, a HCM with a first oxirane monomer selected from the group consisting of an acyclic glycidyl ether, a cyclic glycidyl ether, and a haloalkyl epoxide, in the presence of a catalytic amount of a catalyst selected from the group consisting of an $HMF_6$ acid, and, an oxonium salt of the $HMF_6$ acid, wherein M is an element selected from the group consisting of phosphorus, arsenic and antimony, and, (ii) polymerizing, in a second step, the polymer from said first step with a second oxirane monomer, different from said first oxirane monomer, also selected from the group consisting of an acyclic glycidyl ether, a cyclic glycidyl ether, and a haloalkyl epoxide, in the presence of a catalytic amount of said catalyst.

It is another general object of this invention to provide novel block copolymers prepared by a process which comprises polymerizing (i) a HCM with (ii) at least one ring-openable aliphatic or aromatic glycidyl ether having the structure

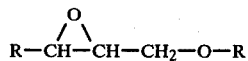   (I)

wherein each R is independently selected from the group consisting of hydrogen, or a substituted group such as a hydrocarbon group, i.e. alkyl or substituted alkyl, particularly haloalkyl, alkenyl or sustituted alkenyl, particularly haloalkenyl, alkoxyalkyl, aryl (Ar) or substituted aryl (Ar—Q), particularly wherein Q is selected from the group consisting of alkyl, haloalkyl each having from 1 to about 10 carbon atoms, alkenyl and haloalkenyl each having from 2 to about 10 carbon atoms; and, optionally, (iii) a haloalkyl epoxide, in the presence of a catalytic amount of a catalyst selected from the group consisting of a hexafluoro acid having the formula $HMF_6$ wherein M is a Group V element selected from phosphorus, arsenic and antimony, and oxonium salts of said hexafluoro acid, to yield a block copolymer having the structure

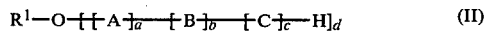   (II)

wherein, $R^1$ represents the residue of said HCM which originally contains from 1 to about 200 hydroxyl groups;

A is derived from a first glycidyl ether having the structure (I);

B is derived from a second glycidyl ether having different substituents from those in said first glycidyl ether but also having structure (I);

C is derived from a haloalkyl epoxide;

when $R^1$ is a polyglycidyl ether residue, (i) at least one of A or B, and C is present; or, (ii) at least two glycidyl ethers arbitrarily selected from A and B are present; and, (iii) when C is present, at least one of A or B is present;

so that the molecular weight of the resulting block copolymer is directly proportional to the amount of monomer converted; and, a, b, and c represent integers in the range from about 5 to about 100;

d represents an integer in the range from 1 to about 200;

so that the molecular weight of each of the segments of the copolymer is in the range from about 500 to about 10,000, the segments are present in a heterogenous relative order, and the molecular weight of the block copolymer is in the range from about 1000 to about 2,000,000.

It is a specific object of this invention to provide graft and branched block copolymers of (i) a HCM having from 1 to about 200 hydroxyl groups per molecule with (ii) a first glycidyl ether having the foregoing structure (I), and, (iii) a second glycidyl ether having the foregoing structure (I) but different from said first glycidyl ether, and, optionally, (iv) an epihaloalkylene ether, in the presence of a catalytic amount of the $HMF_6$ acid, or the oxonium salt of the $HMF_6$ acid, preferably a trialkyl oxonium salt.

It has further been discovered that the choice of the HCM chain propagator is wholly determinative of the structure of a copolymer, particularly a block copolymer, formed by a living cationic ring-opening polymerization of a ring-openable oxirane monomer in the presence of the HCM, under conditions favorable to the polymerization. Such conditions are mild, namely, ambient pressure and a temperature in the range from about 0° C. to about 100° C., generally in a bulk or mass polymerization system, though a solvent may be used to facilitate interaction of the reactants.

It is therefore also a general object of this invention to provide block copolymers of the AB or ABA type, ABC or CBABC types, and the like, wherein A, B, C et seq each represents a block of an oxirane monomer, and at least one of the oxirane monomers is a glycidyl ether. A block graft copolymer may result if the hydroxyl-prepolymer consists essentially of a prepolymer with pendant hydroxyl groups. More simply, a graft (or 'comb') block copolymer will result if the HCM has a multiplicity of pendant hydroxyl groups, as for example in poly(ethylene-vinyl alcohol); or, branched or star-shaped block copolymers may result, if the chain propagator (HCM) has plural hydroxy groups, as for example in glycerol.

It has still further been discovered that a block copolymer of a glycidyl ether and a haloalkyl epoxide formed by propagation with a HCM, may be aminated (quaternized) under elevated temperature and pressure, despite the presence of segments in the block copolymer which are not aminatable. Such amination has been found to occur even when the non-aminatable segments together constitute a major proportion by weight of the block copolymer. The amination of a halo-substituted segment of the block copolymer yields amphophilic polymers found to be especially useful in water

DETAILED DESCRIPTION OF PREFERRED EMBODIMENTS

The cationic ring-opening living polymerization disclosed herein occurs because of the specific catalyst used with an organic hydroxyl-containing material ("HCM) which acts as a chain propagator for a ring-openable glycidyl ether, or for a haloalkyl epoxide; and, for the purpose of this invention, water is not an HCM. Thereafter another glycidyl ether, or an alpha-epihalohydrin, or both, may be sequentially polymerized to form block copolymers, the sequence being a matter of choice. This polymerization reaction was not known to produce block copolymers having the structure (II) which contains at least one glycidyl ether block derived from the structure (I).

The structure (II) of the copolymers formed, is determined by the structure of the HCM chosen and the number and position of its propagating sites (OH groups), the monomers to be reacted therewith, and, if more than two monomers are used, the sequence in which the reactions are carried out, provided the HCM is at least partially soluble, and more preferably, is completely soluble, in the reaction mass (thus referred to herein as "soluble HCM"). By "partially soluble" I refer to a solubility as low as 1 part of HCM per 100 parts by volume of the reaction mass. Ethylene glycol is partially soluble in either glycidyl ether A or B, or in epichlorohydrin C of formula (II) and gives reasonable polymerization rates. When the solubility of the HCM in either the glycidyl ether or the epihalohydrin is so low as to give unacceptable reaction rates, a mutual solvent is used. By "completely soluble" I refer to the formation of a single phase. Irrespective of how the requisite solubility of the HCM in the reaction mass is obtained so as to give acceptable reaction rates, the HCM is referred to as a 'soluble' HCM.

In the preferred embodiment of the invention, the copolymers, (II) are formed by the action of a hexafluorometallic (Group V) acid catalyst, or oxonium salt thereof, in the presence of the soluble HCM brought into contact with a ring-openable glycidyl ether having the structure (I) written hereinabove, and, additionally, optionally with other alkylene oxide monomers, under mild reaction conditions, namely a temperature in the range from about 0° C. to about 110° C., and more preferably from about 25° C. to about 80° C., at ambient or slightly elevated pressure.

The catalyst is selected from a hexafluorometallic (Group V) acid, $HMF_6$ wherein M is an element selected from the group consisting of phosphorus, arsenic and antimony, such acids being $HPF_6$, $HAsF_6$, and $HSbF_6$; and, an oxonium salt of said acid. The catalyst is used in an amount sufficient to initiate the polymerization. It is preferred to use a cyclic or acyclic oxonium salt which may be primary, secondary or tertiary. The cyclic oxonium salt may be prepared by reaction of an acyclic oxonium salt with tetrahydrofuran. It is most preferred to use a trialkyloxonium or other oxonium salt of the $HMF_6$ acid prepared as described in U.S. Pat. No. 3,585,227. The amount of the catalyst used is not critical, from about 0.001 part to about 1 part per 100 parts by wt of oxirane reactants, and more preferably from about 0.01 to about 0.1 part, being generally sufficient. It is desirable, both for economic reasons and for control of the reaction, to keep the amount of catalyst used as low as possible.

As stated hereinabove, the number and position of the hydroxyl groups on the HCM will determine the structure of the resulting HCM-alkylene oxide polymer, and then the resulting block copolymer. In addition, the amount of the HCM used in the polymerization is critical since it determines the mol wt of the resulting HCM-alkylene oxide, and then the block copolymer. When a preselected amount of the HCM of a chosen structure is employed, it functions as a chain propagator, the OH groups serving as propagating sites, and the growth of polymer continues until all the monomer is consumed in the presence of active catalyst.

The theoretical mol wt of the HCM-alkylene oxide polymer is calculated by the following equation:

$$\overline{M}_n = ([\text{monomer}]/[\text{HCM}] \times \text{mol wt of monomer}) \times \frac{\% \text{ conv.}}{100} + \text{mol wt of HCM}$$

For example, polymerization of 114 g (1 mol) of allyl glycidyl ether (first monomer) using 6.2 g (0.1 mol) of ethylene glycol produces a polymer with a mol wt of 1202 at 100% conversion. Since this polymer possesses two terminal hydroxyl groups, it has a theoretical hydroxyl equivalent weight (HEW) of 600. Since the hydroxyl number is (56100/HEW), it (the OH No.) computes to be 93.5.

The HCM-(allylglycidyl ether-OH), namely [HO(AGE)$_a$—EG—(AGE)$_a$—OH], so produced now has propagating OH groups with which another glycidyl ether monomer and/or, optionally, an epihalohydrin monomer, can be sequentially blocked to the HCM-poly(allylglycidyl ether) (hence termed 'living polymer'), again governed by the same considerations for polymer chain growth as before. Again, the mol wt of the AB block copolymer of first and second poly(glycidyl ethers), (say), so formed will be determined as before when all the second monomer is reacted, and the mol wt of the resulting block copolymer may be calculated as before. A third glycidyl ether or an epihalohydrin monomer may be polymerized (grown) on the AB block copolymer and an ABC block terpolymer formed by propagation in an analogous manner, and even additional (fourth et seq) glycidyl ether or epichlorohydrin monomers may be blocked to the ABC block terpolymer formed, if so desired. By preselecting the order in which each glycidyl ether, or, epihalohydrin monomer, is grown to form a block copolymer (containing blocks or segments of each monomer), the resulting positioning of the blocks in a heterogeneous relative order yields block copolymers having distinguishable properties which may be tailored by arbitrarily positioning the blocks.

The benefit of the peculiar catalytic function of the $HMF_6$ acid, or oxonium salt thereof, is obtained with any soluble HCM having the structure $R^1(OH)_n$ wherein n represents an integer in the range from 1 to about 200. The HCM is necessarily free from any other group, that is other than OH, which other group may react in the presence of the catalyst used herein. The HCM may be a non-oligomeric straight chain aliphatic compound, or a cycloaliphatic compound, or an oligomer, any of which may include only one OH, or plural OH groups, whether primary or secondary. If an oligomer, the HCM may be a linear non-crosslinked polyepoxide with reactive OH groups.

$R^1(OH)_n$ preferably represents a monohydric alcohol, or, a polyhydric alcohol which has at least two OH groups, preferably two or three.

$R^1$ is the residue of the HCM, which residue may be alkyl having from 1 to about 24 carbon atoms, preferably lower alkyl having from 1 to about 6 carbon atoms, for example when the HCM is methanol or other lower alkanol; alkylene having from 2 to about 10 carbon atoms when the HCM is an alkane diol, for example, ethylene glycol; polyvinyl having from 2 to about 200 OH groups when the HCM is poly(1,2-butadiene)diol; polyoxyalkylene when the HCM is a polyoxyalkylene glycol, for example poly(tetramethylene ether) glycol; aliphatic polyhydroxy having from 3 to about 100 hydroxyl groups whether the hydroxyl groups are primary or secondary, for example an alkane polyol such as polyvinylbutyral, or poly(styrene-allyl alcohol), or poly(ethylenevinyl alcohol); alkoxyalkyl having from 2 to about 10 carbon atoms; phenoxyalkyl wherein the alkyl groups contains from 1 to about 6 carbon atoms; and the like.

More commonly available monohydric alcohols are alkanols and haloalkanols having from 1 to about 6 carbon atoms (lower alkanols) including methanol, ethanol, 2-chloroethanol, 2,3-dichloropropanol, 2-butanol, hexanol, and the like; higher alkanols and haloalkanols having from 7 to about 20 carbon atoms including hexanol, 1-octanol, heptadecanol, and the like; cycloaliphatic alkanols and haloalkanols having from 4 to about 8 carbon atoms, such as cyclohexanol, 2-chlorocyclohexanol, and the like. Polyhydric alcohols which may be used as HCMs are glycerol, propylene glycol, ethylene glycol, butylene glycols, 1,6-hexanediol, bis(-hydroxymethyl)cyclohexane, hexanetriol, trimethylolethane, trimethylolpropane, bis(4-hydroxycyclohexyl) dimethylmethane, dimethylolbenzenes, 4,4'-dimethyloldiphenylmethane, and dimethylol toluenes.

Most preferred polymeric HCMs include polyoxyalkylene glycols and triols, particularly poly(tetramethylene ether) glycols having a mol wt in the range from about 500 to about 3000; and, hydroxyl-ended polyalkadienes such as poly(butadiene)diol having a mol wt in the range from about 100 to about 5000; and hydroxyl-ended poly(butadiene-styrene) having a mol wt in the range from about 100 to about 5000.

The polyhydric ether alcohols include diglycerol, triglycerol, dimethylolanisoles, beta hydroxyethyl ethers of polyhydric alcohols for example diethylene glycol, and polyethylene glycol; bis(beta hydroxyethyl ether) of hydroquinone; bis(beta hydroxyethyl ether) of bis phenol; beta hydroxyethyl ethers of glycerol; condensates of alkylene oxides such as ethylene oxide, propylene oxide, butylene oxide, isobutylene oxide; glycidol; glycidyl ethers with polyhydric alcohols mentioned herein, and with polythioethers such as 2,2'-dihydroxydiethyl sulfide and 2,2'-3,3'-tetrahydroxy propyl sulfide.

The mercapto (thiol) alcohols are exemplified by alpha-monothioglycerol and alpha,alpha'-dithioglycerol. Commonly available are alkylated polyhydric alcohols which include hydroxyalkylated cellulose, glucose and the like; and, halogenated polyhydric alcohols, particularly the chlorides of sorbitol, of mannitol, and of glycerol. For steric reasons, preselected OH groups of polyols such as mannitol and sorbitol are generally rendered inactive by reaction with a suitable OH-inactivating agent, preferably by selective alkylation.

Still other HCMs may be obtained by reacting a polyhydric alcohol with a polyepoxide, such as the reaction product of glycerol and bis(2,3-epoxy-propyl)ether; and still others are silicone polycarbinols commonly available as Dow Corning ®Q4-3558, Q4-3667, Q2-8026 and Q4-3557.

The block copolymer formed will have as many OH propagation sites as does the HCM from which the block copolymer is grown. When it is desired to form a linear block, or, branched ('star') block copolymer, the HCM will typically have from 1 to 4 terminal OH groups. When the HCM is a prepolymer with plural pendant OH groups, a graft or comblike block copolymer is formed. The number of pendant OH groups is not critical and may be large, but is generally less than 200, and more preferably from 4 to about 50.

The block copolymerization of my invention may be carried out in bulk if the HCM is completely soluble in the reaction mass, or in the presence of a suitable solvent if the HCM is only partially soluble. It is preferred to keep the amount of solvent used to a minimum for best results. Any solvent for the reaction mass, that is, a mutual solvent for the HCM and the glycidyl ether or haloalkyl epoxide, may be used provided the solvent itself does not interfere with the block copolymerization reaction. Typically, a solvent from the class of aromatic hydrocarbons such as xylene, aliphatic hydrocarbons such as hexane, petroleum ethers, polyethers such as diglyme, and chlorinated hydrocarbons such as methylene chloride, chloroform, dichloromethane, and chlorobenzenes which are most preferred.

The temperature employed in the polymerization process of the present invention is usually between about 0° C. and 110° C. However, it is preferred to employ temperatures in the range from about 25° C. to about 80° C., since at these temperatures desirable polymerization rates are obtained without decomposition of the catalyst. It may be desirable, in many cases, to preheat or precool the contents of the reactor to the desired reaction temperature prior to the addition thereto of the catalyst or initiator.

The polymerization reaction is exothermic. However, the reaction temperature is readily maintained by the controlled rate of catalyst addition, and suitable heat exchange means. The time of the polymerization reaction will normally vary from about 1 to about 10 hours and in many cases, will take up to about 24 hours or more, depending upon the particular catalyst used, the amount used, the temperature, and other factors.

The progress of the reaction may be monitored by periodic sampling to determine the amount of monomer converted. On completion of the polymerization, the reaction is terminated by neutralizing the catalyst, generally by adding a slight molar excess of a base such as ammonium hydroxide in an alcoholic (isopropanol) solution. Unreacted monomer, if there is any, may be removed by evaporation under vacuum.

The polymers formed by the process described herein can be of higher mol wt that is, higher than the mol wts heretofore normally obtainable by prior methods for the cationic polymerization of epihalohydrins, as taught for example in the Dreyfus '856 patent. The polymers will vary from liquids, to semisolids, to solids, and the weight average (wt avg) mol wt of such polymers will vary from about 1,000 to about 2,000,000.

Molecular weights are preferably determined by gel permeation chromatography (GPC) using a Waters Model 200 instrument equipped with a modified Waters R4 differential refractometer detector. The solvent used is THF and flow rate is 2.0 $mm^3$/min, in a column 25 cm×7.8 mm ID, packed with Waters Microstyragel.

The mol wt of block copolymers may also be obtained by determining the OH No. and calculating the number avg mol wt as described in *Preparative Methods of Polymer Chemistry*, Sorenson, W. R. and Campbell, T. W., pg 155, Interscience Publishers, 2nd ed. (1968).

The polymerization process, described herein, may be carried out at autogenous pressures although superatmospheric pressures of up to 10 atmospheres or more may be employed with some advantage with the more volatile monomers. Superatmospheric pressures may also be employed with those monomers and/or solvents having the requisite volatilities at reaction temperatures permitting reflux cooling of the reaction mixture.

The unexpected results of the instant invention are formation of block copolymers having (i) designed (desired) mol wt, (ii) designed structure, as a result of the positioning of preselected propagating sites, and (iii) precise functionality, which block copolymers are produced with (iv) excellent control of the temperature of polymerization, (v) high yield, and (vi) high catalyst efficiency. By 'catalyst efficiency' is meant the weight of polymer produced per unit weight of catalyst (initiator) employed. For example, a yield of about 1 kg of polymer to about 10 kg of polymer per (one) gram of catalyst used is obtained by use of the present invention. Such high yields are comparable only to those obtained by the Dreyfuss process mentioned hereinabove. Moreover, because the mol wt and functionality are controlled, the viscosity of the polymer is controlled.

As might be expected, the rate at which each oxirane monomer is polymerized will depend upon its structure, other conditions being the same. It has been found that the rate at which an aromatic glycidyl ether, such as phenyl or naphthyl glycidyl ether, is polymerized, is greater than that of an alkylene glycidyl ether such as allyl glycidyl ether, which in turn is greater than that of a haloalkyl epoxide such as epichlorohydrin. Thus, in the preparation of a block copolymer, it is generally desirable to polymerize the least reactive block first and the most reactive monomer last.

The quaternization ("amination") of polyepihalohydrins is known to yield highly water soluble products useful as coagulants, for example in the treatment of raw sewage, and the breaking of oil-in-water emulsions as disclosed in U.S. Pat. No. 3,591,520. The aminated block copolymers are also useful as surfactants, sizing agents, anti-static agents ("anti-stats") and the like. Thus, when the block glycidyl ether copolymers of my invention contain a reactive halogen, the segment containing the halogen may be conventionally aminated with an amine capable of an addition reaction with the halogen-containing segment, to yield an aminated glycidyl ether block copolymer.

In the aminated glycidyl ether block copolymer, each reactive halogen is typically replaced with $(N^+R_3^2.X^-)$ alkylammonium halide wherein X represents halogen, usually Cl, Br or I, and $R^2$ is the residue of an amine, identified hereinbelow, used to aminate the block copolymer. If each glycidyl ether monomer is halo-substituted, and the two monomers are blocked together, at least some of the halogen substituents of each block of the block copolymer will be aminated.

If no portion of the aminated block copolymer is hydrophobic, it will be hydrophilic. Controlled amphophilicity is most preferably attained by adjusting the length of the PECH block, that is, choosing 'c', and/or choosing the HCM which may have reactive halogen substituents intermediate its OH propagating sites. In addition, the length of one or more poly(glycidyl) segments, and/or the halogen substituents of either, may be chosen (that is, 'a' or 'b').

In particular, $R^1$ may be the residue of a poly(glycidyl ether) in which the monomer has the structure (I) in which the substituted group R includes a reactive halogen substituent. Preferred substituted groups are hydrocarbon groups such as alkyl having from 1 to about 30 carbon atoms including methyl, ethyl, propyl, butyl, amyl, hexyl, heptyl, octyl, nonyl, decyl, undecyl, tridecyl, and the like, most preferred of which are lower alkyl having from 1 to about 6 carbon atoms; alkenyl, referring to analogues of alkyl groups containing one or more —C=C— groups, for example, butenyl, pentenyl, hexenyl, decenyl, dodecenyl, tridecenyl, and the like, most preferred of which are lower alkenyl; or, dienyl, for example, butadienyl, pentadienyl, hexadienyl, heptadienyl, octadienyl, and the like, most preferred of which are lower dienyl; aryl, including phenyl, substituted phenyl, alkyl phenyl, polyalkylphenyl, alkoxyphenyl, naphthyl, alkyl naphthyl, benzyl, substituted benzyl, and the like, most preferred of which are phenyl and alkylphenyl.

Segments of PECH are the most preferred if block copolymers of this invention are to be aminated. Amination of the chloromethyl groups in PECH are the most preferred if block copolymers of this invention are to be aminated. Amination of the chloromethyl groups in PECH with a wide variety of aliphatic and aromatic amines is known to produce the corresponding ammonium salt which provides cationic charges and imparts hydrophilicity to the polymer. It is known that amination of PECH may be effected in such a manner as to convert the normally hydrophobic PECH to a hydrophilic polymer, but a polymer with amphophilic properties, that is, having both hydrophilic and hydrophobic characteristics, is difficult to obtain. Controlled amphophilic properties are of especial interest in the 'fabrication' of water-treatment chemicals. The block copolymers of this invention may be tailored so that the degree of hydrophilicity or amphophilicity may be controlled by the structure of the block copolymer, the type of amine used to aminate it, and the number of chloromethyl groups which are actually aminated.

When PECH is one of the segments to be aminated, at least one of the segments being a glycidyl ether, the aminated block copolymer has the structure

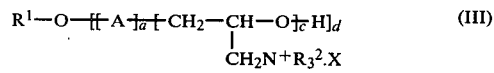
$$R^1-O-[[-A-]_a-[-CH_2-CH-O-]_c-H]_d \quad \text{(III)}$$
$$\vert$$
$$CH_2N^+R_3^2.X$$

wherein X represents a halogen, $R^1$, $R^2$ and A have the same connotation as as set forth hereinabove, and a, c, and d represent numerals defined as for structure (II).

Any conventionally used amine may be used for aminating PECH. Preferred amines are selected from the group consisting of: alkylamines, dialkylamines, and trialkylamines having from 1 to about 30 carbon atoms, and more preferably from 1 to about 6 carbon atoms; cyclic alkylamines having from 5 to about 7 carbon atoms, more preferably cyclohexylamine; fatty amines having from 10 to about 50 carbon atoms; polymeric amines and polyetheramines having a mol wt in the range from about 100 to about 500; alkanolamines having from 1 to about 30 carbon atoms, and more preferably from 1 to about 6 carbon atoms; morpholine; pyridine; aniline; thiazines; and silane-containing amines having from 5 to about 20 carbon atoms.

Preferred for amination are block copolymers with a multiplicity of reactive chlorine atoms so that at least 20 percent of all Cl atoms are aminated. When the residue is non-aminatable, and a segment of the block copolymer is aminatable, the aminated block copolymer will be amphophilic.

Amination is usually effected using a predetermined stoichiometric amount of the amine, or a slight excess over the amount calculated as being necessary to effect the desired degree of amination. A solvent, such as a lower alkyl cyanide such as acetonitrile, an aliphatic ketone having from 2 to about 20 carbon atoms, particularly acetone, or even water, may be used to obtain a homogeneous solution, though obtaining such a solution is not necessary. It is preferred for amination, to use block copolymers which do not require a solvent. The reaction is carried out in the range from about 40° C. to about 150° C. and autogenous pressure. It will be recognized that, when the amine is gaseous under the conditions of amination, the reaction is preferably carried out under elevated pressure in the range from about 50 psig to about 500 psig.

The block copolymers of this invention, optionally aminated, are particularly useful in chain extension reactions, the chain extending agent being any polyfunctional compound which will react, under appropriate conditions of temperature, pressure and suitable catalyst, with the hydroxyl groups. Such compounds can be polyisocyanates such as m- or p-phenylene diisocyanate, 2,4-toluene diisocyanate, etc., or polyepoxides such as Epon resins, as for example, the diglycidyl ether of Bisphenol A, and the like. The difunctional chain-extending agents are generally used in stoichiometric amounts to the reactive hydroxyl groups at the chain ends, when a linear, relatively high mol wt polymer is desired, such as may be soluble in commonly available solvents. When the chain-extending agent contains more than two functional groups, and the hydroxyl-ended polymer has two reactive hydroxyl groups, the polymer formed will be cross-linked.

EXAMPLE I

HCM with single (1) OH propagating site:

(i) HCM is ethylene glycol monomethyl ether (EGME), and first ECH, then AGE are polymerized forming the block copolymer $CH_3OCH_2CH_2-O-[(ECH)_c-(AGE)_a]$.

The procedure for the block copolymerization is as follows: 2.5 mol (231.25 g) of ECH and 0.5 mol (38 g) of EGME are charged to a three-necked 1 liter flask and 0.25 g TEOP in 15 ml of methylene chloride ($CH_2Cl_2$) injected into the flask. The polymerization is carried out for 4 hrs at 30° C., then at room temperature overnight so as to obtain essentially 100% conversion. The mol wt (by GPC analysis) is $\overline{M}n=790$ and the calculated mol wt is 539. The distribution shown is monomodal indicating the formation of a well-defined polymer. Thereafter, 2.5 mol (285.5 g) dried AGE is added, and then 0.165 g TEOP in 1 ml of $CH_2Cl_2$ gradually injected, and the polymerization continued overnight when sampling indicated the AGE monomer was essentially all converted to polymer. The mol wt of the polymer is found to be 1260 and the calculated mol wt is 1108 with a monomodal distribution, confirming the above structure of the polymer.

In an analogous manner, the molar ratios of ECH and AGE are varied so that the numerical values of c and a in the block copolymer formed each range from 5 to 100.

(ii) In a manner analogous to that described hereinabove, ECH and PGE are sequentially blocked with EGME as the HCM to yield a block copolymer found to have the structure $EGME-[(ECH)_c-(PGE)_b]$, and as before, the molar ratios of ECH and PGE are varied so that the numerical values of c and b each range from 5 to about 100.

Specific block copolymers of types (i) and (ii) hereinabove are made with different lengths of segments, and the properties compared. The data are set forth in Table I hereunder:

TABLE I

| Type | (i) | | (ii) | |
|---|---|---|---|---|
| Ratio | c/a = 5/5 | c/a = 10/10 | c/b = 5/5 | c/b = 10/10 |
| Recipe: | | | | |
| EGME | 7.6 | 7.6 | 7.6 | 7.6 |
| ECH | 46.3 | 92.5 | 46.3 | 92.5 |
| TEOP | 0.05 | 0.09 | 0.05 | 0.09 |
| AGE | 57. | 114.1 | — | — |
| PGE | — | — | 75.1 | 150.2 |
| TEOP | 0.033 | 0.068 | 0.025 | 0.050 |
| Conversion % | 98. | 92.6 | 100 | 99.5 |
| Properties: | | | | |
| viscosity, cps at 27° C. | 650 | 940 | 38,200 | 229,000 |
| OH No. (found) | 49.5 | 32.7 | 50.8 | 37.1 |
| OH No. (calc.) | 51.6 | 28.3 | 43.5 | 22.4 |
| Mol Wt $\overline{M}n$ | 1260 | 1560 | 1580 | 2210 |
| $\overline{M}w$ | 2730 | 3720 | 2310 | 3980 |
| Peak | 1190 | 1940 | 1740 | 2840 |

(iii) In a manner analogous to that described hereinabove, ECH, then an alkyl glycidyl ether such as butyl glycidyl ether (BGE), are sequentially blocked with EGME as the HCM to yield a block copolymer found to have the structure $EGME-[(ECH)_c-(BGE)_a]$, and as before, the molar ratios of ECH, and BGE are varied so that the numerical values of each range from 5 to about 100. When the ratio c/a/=5/5, conversion to the block copolymer is in excess of 95%, the viscosity at 27° C. is 390 cps and the $\overline{M}n=1000$, the $\overline{M}w=1500$, and the peak is 1070. The calculated mol wt is 1189.

(iv) In a manner analogous to that described hereinabove, AGE, then PGE are sequentially blocked with EGME as the HCM to yield a block copolymer found to have the structure $CH_3OCH_2CH_2-[(AGE)_a-(PGE)_b]$, and as before, the molar ratios of AGE and PGE are varied so that the numerical values of each range from 5 to about 100.

(v) In a manner analogous to that described hereinabove, ECH, then AGE, then PGE are sequentially blocked with EGME as the HCM to yield a block copolymer found to have the structure $CH_3OCH_2CH_2-[(ECH)_c-(AGE)_a-(PGE)_b]$, and as before, the molar ratios of ECH, AGE and PGE are varied so that the numerical values of each range from 5 to about 100.

(vi) In a manner analogous to that described hereinabove, ECH and PGE are sequentially blocked with methyl alcohol (MeOH) as the HCM to yield a block copolymer found to have the structure $[CH_3-O-(ECH)_c-(PGE)_b]$, and as before, the molar ratios of ECH and PGE are varied so that the numerical values of c and b each range from 5 to about 100.

EXAMPLE II

HCM with two (2) propagating sites:

(i) HCM is ethylene glycol (EG), sequentially blocked monomers are (ECH), and then (AGE) forming $[(AGE)_a-(ECH)_c-O-CH_2CH_2-O-(ECH)_c-(AGE)_a]$.

Into a three-necked 2 liter flask fitted with a mechanical stirrer, a thermometer and a rubber septum were charged 5 mol (463 g) of ECH and 0.25 mol (15.5 g) of EG, and the reactor was purged with nitrogen. TEOP initiator, 0.1 g, in 25 ml methylene chloride solution was added, a little at a time, with a hypodermic syringe while maintaining the temperature of the reaction mixture at about 30° C. The polymerization was complete in about 10 hrs, after which 5 mol (570.5 g) of AGE are added to the flask. An additional amount of TEOP (0.1 g) is slowly added to the mixture, again maintaining the temperature of the reaction mixture at about 30° C. The polymerization appeared to be completed in about 10 hrs, and was terminated by washing with sodium bicarbonate solution.

The calculated mol wt of the polymer is 4192. The OH No. is 22.2 and the calculated OH No. is 26.7.

The structure of the polymer formed is [(AGE)$_{10}$—(ECH)$_{10}$—O—CH$_2$CH$_2$—O—(ECH)$_{10}$—(AGE)$_{10}$], and as before, the molar ratios of AGE and ECH may be varied so that the numerical values of each range from about 5 to about 100.

(ii) In a manner analogous to that described hereinabove, AGE and PGE are sequentially blocked with EG as the HCM to yield a block copolymer found to have the structure [(PGE)$_b$—(AGE)$_a$—EG—(AGE)$_a$—(PGE)$_b$], and as before, the molar ratios of ECH and PGE are varied so that the numerical values of c and b each range from 5 to about 100.

(iii) In a manner analogous to that described hereinabove, ECH, then AGE, then PGE are sequentially blocked with EG as the HCM to yield a block copolymer found to have the structure [(PGE)$_b$—(AGE)$_a$—(ECH)$_c$—EG—(ECH)$_c$—(AGE)$_a$—(PGE)$_b$], and as before, the molar ratios of ECH, AGE and PGE are varied so that the numerical values of each range from 5 to about 100.

(iv) In a manner analogous to that described hereinabove, ECH and PGE are sequentially blocked with poly(tetrahydrofuran)glycol (PTHF) as the HCM to yield a block copolymer found to have the structure [(PGE)$_b$—(ECH)$_c$—O—(CH$_2$—CH$_2$—CH$_2$—CH$_2$—O—$_n$(ECH)$_c$—(PGE)$_b$], and as before, the molar ratios of ECH and PGE are varied so that the numerical values of c and b each range from 5 to about 100.

(v) In a manner analogous to that described hereinabove, ECH, then AGE, then PGE are sequentially blocked with poly(tetrahydrofuran)glycol ("PTHF") as the HCM to yield a block copolymer found to have the structure [(PGE)$_b$—(AGE)$_a$—(ECH)$_c$—PTHF—(ECH)$_c$—(AGE)$_a$—(PGE)$_b$], and as before, the molar ratios of ECH, AGE and PGE are varied so that the numerical values of each range from 5 to about 100.

An analogous procedure to that set forth immediately hereinabove is used to prepare block copolymers with the following HCMs: propylene glycol, butylene glycol, diethylene glycol, polyethylene glycol, triethylene glycol, polypropylene glycol, 1,6-hexanediol, 1,4-cyclohexanediol, 1,4-cyclo-hexanedimethanol, and the like.

EXAMPLE III

HCM with three (3) OH propagating sites:

(i) HCM is glycerol, and first, ECH, then AGE are polymerized forming a branched block copolymer having the structure:

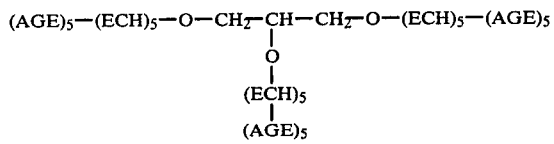

The procedure for the block copolymerization is as follows: 4.6 g (0.05 mol) of glycerol and 69.3 g (0.75 mol) of ECH are charged to a three-necked 250 ml flask on a water bath and 0.031 g TEOP in 3 ml of methylene chloride is injected into the flask. The polymerization is carried out for 4 hrs at 30° C., than at room temperature overnight so as to obtain essentially 100% conversion. The mol wt by GPC analysis is found to be $\overline{M}n = 1510$ and the calculated mol wt is 1480. The distribution shown is monomodal indicating the formation of a well-defined polymer. Thereafter, 85.5 g (0.75 mol) of dried AGE is added, and then 0.045 g TEOP in 1 ml of CH$_2$Cl$_2$ gradually injected, and the polymerization continued overnight when sampling indicated the AGE monomer was essentially all converted to polymer. The calculated mol wt is 3190. Analysis fo the polymer confirmed that its structure is that shown above wherein c and a are each 5.

Conversion of the monomer in each step is substantially 100%. The viscosity of the branched block copolymer is 2200 cps at 27° C., the $\overline{M}n = 1610$, the $\overline{M}w = 3130$ and the Peak = 2290. The OH No. found is 41, and the calculated OH No. is 54.

(ii) In a manner analogous to that described hereinabove, ECH, then an alkyl glycidyl ether such as butyl glycidyl ether (BGE), are sequentially blocked with trimethylolpropane (TMP) as the HCM to yield a block copolymer found to have the structure TMP—[(ECH)$_c$—(BGE)$_a$]$_3$, and as before, the molar ratios of ECH, and BGE are varied so that the numerical values of each range from 5 to about 100.

EXAMPLE IV

HCM with four (4) or more, OH propagating sites:

(i) HCM (styrene-allyl alcohol)copolymer, and first, ECH, then AGE are polymerized forming a graft (or 'comb') block copolymer having the structure:

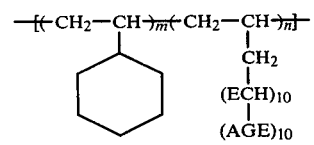

The procedure for the graft block copolymerization is as follows: 92.5 g (1 mol) of ECH, 29.8 g (0.1 mol) (styrene-allyl alcohol) copolymer obtained from Scientific Polymer Products, Inc. are charged to a 1-liter flask, in an and fitted as in Example 3 hereinabove. 0.084 g of TEOP in 5 ml of CH$_2$Cl$_2$ solution is incrementally added to the mixture in the flask with stirring while maintaining the temperature at 30° C. The conversion to polymer reaches substantially 100%. Thereafter, 1 mol (114 g) of AGE are added to the flask along with 0.08 g of TEOP added incrementally, and the polymerization allowed to proceed overnight at 30° C., until substantially 100% conversion is attained. The polymerization is then terminated as before with NH$_4$OH in isopropanol.

Preferred copolymers range in mol wt from about 1000 to about 5000 but others may be used wherein m and n are integers in the range from about 3 to about 50, it being understood they are random.

(ii) In an analogous manner, a graft or comb polymer is formed when the HCM is poly(glycidol) and first, ECH, then AGE are polymerized.

EXAMPLE V

Amination of block copolymers:

(i) 44.3 g (0.2 eq) of the block copolymer prepared in example I(i) hereinabove is charged into a 12 oz bottle, capped, and cooled with an ice-water bath. When cool, 10 g (0.22 eq) of dimethyl amine and then 5 ml of acetonitrile were injected into the bottle. The amination reaction was carried out at 60° C. while tumbling the bottle in a constant temperature bath. At the end of the reaction the pressure in the bottle had dropped from 40 psig to about 7 psig. The product obtained was dried in vacuo at 60° C. for about 2 hr to remove excess unreacted amine and the solvent. A yellowish semi-solid ammonium salt is obtained which was essentially completely soluble in water.

(ii) In a manner analogous to that described hereinabove in example V(i), 200 g of a block copolymer having the structure $CH_3OCH_2CH_2$—O—(ECH-)$_5$—(BGE)$_5$ was dissolved in 200 ml methanol and aminated with 14.9 g trimethylamine at about 100° C. for 8 hr, and the aminated polymer recovered. The aminated polymer contained 3.3% $Cl^-$ indicating that about 24% of the PECH segment was aminated. The aminated polymer was amphophilic.

(iii) In a manner analogous to that described hereinabove in example V(ii), 200 g of a block copolymer having the structure $CH_3OCH_2CH_2$—O—(ECH-)$_5$—(AGE)$_5$ was dissolved in 200 ml methanol and aminated with 24.8 g trimethylamine at about 100° C. for 8 hr, and the aminated polymer recovered. The aminated polymer contained 4.4% $Cl^-$ indicating that about 32% of the PECH segment was aminated. The aminated polymer was amphophilic.

(iv) In a manner analogous to that described hereinabove in example V(ii), 200 g of block copolymer having the structure $CH_3OCH_2CH_2$—O—(ECH)-$_{20}$—(AGE)$_{20}$ was dissolved in 200 ml methanol, containing 2 g of an antioxidant (2,2'-methylene-bis-bis-(4-methyl-6-t-butylphenol) and aminated with 26.7 g trimethylamine at about 100° C. for 8 hr, and the aminated polymer recovered. The aminated polymer contained 4.3% $Cl^-$ indicating that about 28% of the PECH segment was aminated. The aminated polymer was amphophilic.

(v) In a manner analogous to that described hereinabove in example V(ii), 200 g of a block copolymer having the structure $CH_3OCH_2CH_2$—O—(ECH-)$_5$—(AGE)$_5$ was dissolved in 200 ml methanol containing 2 g AO 1506 antioxidant, and aminated with 32.7 g trimethylamine at about 100° C. for 8 hr, and the aminated polymer recovered. The aminated polymer contained 44% Cl indicating that about 32% of the PECH segment was aminated. The aminated polymer was amphophilic.

(iii) In a manner analogous to that described hereinabove in example V(ii), 200 g of a block copolymer having the structure $CH_3OCH_2CH_2$—O—(ECH-)$_5$—(AGE)$_5$ was dissolved in 200 ml methanol containing 2 g of AO 1506 anti-oxidant added, and aminated with 27.6 g trimethylamine at about 100° C. for 8 hr, and the aminated polymer recovered. The aminated polymer contained 2.6% Cl indicating that about 16% of the PECH segment was aminated. The aminated polymer was amphophilic.

EXAMPLE VI

HCM is poly(glycidyl ether) with two (2) OH propagating sites:

A hydroxy-ended poly(allyl glycidyl ether) is first prepared in a manner analogous to that described in the Dreyfuss '856 patent, so as to form a polymer having a mol wt of about 2800. Then 40 g of this polymer are used as the HCM with 120 g of ECH in a 250 ml three-necked flask, with 0.010 g of TEOP in 5 ml of $CH_2Cl_2$ and the polymerization carried out at 30° C. overnight, in a manner analogous to that described hereinbefore. Essentially all the ECH is converted (about 98%) to form an ABA block copolymer identified as (ECH-$_{50}$—AGE$_{25}$—ECH$_{50}$) having a mol wt of about 12000.

The temperature of the block copolymerization reaction is preferably maintained in the range from about 20°–60° C. in all the foregoing examples, it being recognized that a temperatures below 20° C. the reaction is slow; and, at temperatures above 60° C., unwanted byproducts are formed and the catalyst is deactivated.

As will be evident from the foregoing examples, it is not critical with respect to the initiation and propagation of these block copolymers, what particular glycidyl ether is chosen, except of course as it affects the kinetics of the polymerization. Some glycidyl ethers having the structure (I) form polymers more quickly than others. Also, the particular properties of the block copolymer formed will depend upon the choice of glycidyl ether(s). Thus one skilled in the art will appreciate that a modicum of trial and error will result in the proper choice of a glycidyl ether if it is selected from the group consisting of alkyl, including methyl, ethyl, propyl, butyl, amyl, hexyl, heptyl, octyl, nonyl, decyl, undecyl, tridecyl, and the like having from 1 to about 40 carbon atoms, more preferably lower alkyl having from 1 to about 6 carbon atoms; alkenyl, being olefinically unsaturated analogs of alkyl groups, and containing from 1 to about 40 carbon atoms, including decenyl, dodecenyl, tridecenyl; dienes for example octadienyl, but preferably lower alkenyl having from 1 to about 6 carbon atoms; and cycloalkyl, preferably cyclohexyl, or substituted cycloalkyl having from 5 to 7 ring carbon atoms.

Additionally, tailoring the structure of the block copolymer for desirable properties may be done by the choice of HCM. Preferably these HCMs are (i) compounds having 1 to 4 terminal OH propagating sites (referred to as first compounds) among which are non-polymeric and polymeric compounds (first hydroxyl-terminated prepolymers); or, (ii) compounds having from 1 to about 50 pendant OH propagating sites (referred to as second compounds) among which are non-polymeric and polymeric compounds (second hydroxy-terminated prepolymers).

The non-polymeric first compounds are selected from the group consisting of alkanols, haloalkanols, alkyl polyols and haloalkyl polyols having from 1 to about 20 carbon atoms; alkenols, haloalkenols, alkenyl polyols and haloalkenyl polyols having from 1 to about 20 carbon atoms; alkynols, haloalkynols, alkynyl polyols, and haloalkynyl polyols having from 1 to about 20 carbon atoms; cyclic alkanols having from 5 to about 10 carbon atoms forming one or two rings, particularly cyclohexanol; cyclic alkenyl polyols having from 5 to about 10 carbon atoms forming one or two rings, particularly cyclohexenyl diol; and, mercapto alcohols having from 1 to about 20 carbon atoms.

The first hydroxyl-terminated prepolymer is selected from the group consisting of polyalkanes, polyalkenes, polyalkynes, polyvinylbenzenes, optionally with substituents selected from halogens, hydrocarbyl groups, and the like, preferably with the prepolymer having a mol wt in the range from about 500 to about 5000; poly(alpha-epihalohydrin); poly(alkylene ether) having from 4 to about 12 carbon atoms; and, poly(glycidyl ether) having the structure (I) wherein R is selected from the group consisting of alkyl having from 1 to about 30 carbon atoms, alkenyl, aryl (Ar), and substituted aryl (Ar—Q) wherein Q is selected from the group consisting of alkyl, haloalkyl, each having from 1 to about 10 carbon atoms.

The non-polymeric second compound is selected from the group consisting of an alkane or haloalkane having from 1 to about 40 carbon atoms having from 1 to about 20 pendant OH propagating sites, for example 2,4,6-decane triol.

The second hydroxyl-terminated prepolymer is selected from the group consisting of alkylated polyhydric alcohols such as poly(styrene-allyl alcohol) and halogenated polyhydric alcohols such as poly(chlorostyrene-allyl alcohol) having a mol wt in the range from about 200 to about 5000; and, polyacetals such as poly(vinyl butyral) having a mol wt in the range from about 1500 to about 50,000.

I claim:

1. A block copolymer having at least one polyglycidyl ether block said block copolymer having the structure

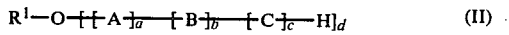

wherein, $R^1$ represents the residue of a hydroxyl-containing material (HCM) selected from a first compound having from 1 to 4 terminal hydroxy (OH) propagating sites, including a first hydroxyl-terminated prepolymer having from 1 to 4 terminal OH propagating sites; and, a second compound having from 1 to about 200 pendant OH propagating sites;

A is derived from a first glycidyl ether having the structure

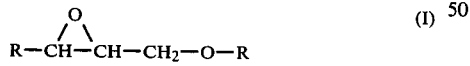

wherein each R is independently selected from the group consisting of hydrogen, alkyl, haloalkyl, oxyalkylene, oxyhaloalkylene, alkoxyalkyl, aryl (Ar) and substituted aryl (Ar—Q), wherein Q is selected from the group consisting of alkyl, haloalkyl each having from 1 to about 10 carbon atoms, alkenyl and haloalkenyl each having from 2 to about 10 carbon atoms; and, unsaturated hydrocarbyl radicals, B is derived from a second glycidyl ether having different substituents from those in said first glycidyl ether but also having structure (I);

C is derived from a haloalkyl epoxide;

when $R^1$ is polyglycidyl ether residue,
(i) at least one of A or B, and C is present;
(ii) at least two glycidyl ethers arbitrarily selected from A and B are present; and,
(iii) when C is present, at least one of A or B is present;

so that the molecular weight of the resulting block copolymer is directly proportional to the amount of monomer converted; and, a, b, and c represent integers in the range from about 5 to about 100;

D represents an integer in the range from 1 to about 200; so that the molecular weight of each of the segments of the copolymer is in the range from about 500 to about 10,000, the segments are present in a heterogenous relative order, and the molecular weight of the block copolymer is in the range from about 1000 to about 2,000,000.

2. The block copolymer of claim 1 wherein said second compound has from 1 to about 50 pendant OH propagating sites, including a second hydroxyl-terminated prepolymer having from 1 to about 50 pendant OH propagating sites.

3. The block copolymer of claim 2 wherein
said first compound is selected from the group consisting of alkanols, haloalkanols, alkane polyols and haloalkane polyols having from 1 to about 20 carbon atoms; alkenols, haloalkenols, alkenyl polyols and haloalkenyl polyols having from 1 to about 20 carbon atoms; alkinols, haloalkinols, alkynyl polyols, and haloalkinyl polyols having from 1 to about 20 carbon atoms; cyclic alkanols having from 5 to about 10 carbon atoms forming one or two rings, particularly cyclohexanol; cyclic alkenyl polyols having from 5 to about 10 carbon atoms forming one or two rings, particularly cyclohexenyl diol; and, mercapto alcohols having from 1 to about 20 carbon atoms;

said first hydroxyl-terminated prepolymer is selected from the group consisting of polyalkanes, polyalkenes, polyalkynes, polyvinylbenzenes, optionally with substituents selected from halogens and hydrocarbyl groups, said first prepolymer having a mol wt in the range from about 500 to about 5000; poly(alpha-epihalohydrin); poly(alkylene ether) having from 4 to about 12 carbon atoms; and poly(glycidyl ether) having the structure (I) wherein R is selected from the group consisting of alkyl having from 1 to about 30 carbon atoms, alkenyl, aryl (Ar), and substituted aryl (Ar—Q) wherein Q is selected from the group consisting of alkyl, haloalkyl, each having from 1 toabout 10 carbon atoms;

said non-polymeric second compound is selected from the group consisting of an alkane or haloalkane having from 1 to about 40 carbon atoms having from 1 to about 20 pendant OH propagating sites, for example 2,4,6-decane triol; and, said second hydroxyl-terminated prepolymer is selected from the group consisting of alkylated polyhydric alcohols such as poly(styrene-allyl alcohol), halogenated polyhydric alcohols such as poly(chlorostyrene-allyl alcohol) having a mol wt in the range from about 200 to about 5000; and, polyacetals such as poly(vinyl butyral) having a mol wt in the range from about 1500 to about 50,000.

4. The block copolymer of claim 3 wherein said first hyroxyl-terminated prepolymer is a polyalkene selected from the group consisting of polymers of monoolefinically unsaturated olefins having from 2 to about 6 carbon atoms, and polymers of dienes having from 4 to about 6 carbon atoms.

5. The block copolymers of claim 3 wherein said first hydroxyl-terminated prepolymer is a poly(glycidyl ether) selected from the group consisting of poly(alkyl glycidyl ether), poly(allyl glycidyl ether), poly(phenyl glycidyl ether), and poly(chlorophenyl glycidyl ether).

6. The block copolymer of claim 3 wherein said first hydroxyl-terminated prepolymer is poly(epihalohydrin) selected from the group consisting of poly(epibromohydrin) and poly(epichlorohydrin).

7. The block copolymer of claim 3 wherein said first hydroxyl-terminated prepolymer is a poly(alkylene ether) glycol selected from the group consisting of poly(tetramethylene ether)glycol, and poly(pentamethylene ether)glycol.

8. The block copolymer of claim 3 wherein said first hydroxyl-terminated prepolymer is a copolymer selected from the group consisting of poly(styrene-co-butadiene), and poly(styrene-co-isoprene).

9. The block copolymer of claim 3 wherein said first hydroxyl-terminated prepolymer is a polyalkadiene diol selected from the group consisting of poly(butadiene) diol and poly(pentadiene) diol.

10. The block copolymer of claim 3 wherein said second hydroxyl-terminated prepolymer is selected from the group consisting of poly(styrene-allyl alcohol), poly(ethylene-co-vinyl alcohol), and poly(vinyl butyral).

11. The block copolymer of claim 1 wherein at least one segment, and, optionally, $R^1$, contains a reactive halogen capable of an addition reaction with an amine to yield an aminated block copolymer.

12. The block copolymer of claim 11 wherein segment C is present, and said aminated block copolymer is an amphophilic block copolymer having the structure

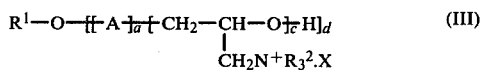

(III)

wherein
X represents a halogen, and
$R_3^2$ is the residue of an amine selected from the group consisting of an alkylamine, dialkylamine, trialkylamine, cyclic alkylamine, fatty amine, polymeric amine, aromatic amine, polyetheramine, alkanolamine, thiazine, morpholine and a silane-containing amine.

13. The aminated block copolymer of claim 12 wherein said segment C is epichlorohydrin, and said amine is a lower alkylamine having from 1 to about 6 carbon atoms.

14. The amphophilic block copolymer of claim 11 wherein at least 20 percent of all reactive halogens are aminated.

15. The amphophilic block copolymer of claim 12 wherein segment A is selected from the group consisting of allyl glycidyl ether, phenyl glycidyl ether and a lower alkyl glycidyl ether having from 1 to about 6 carbon atoms.

16. A process for the manufacture of a poly(glycidyl ether) block copolymer, which process comprises,
(i) polymerizing, in a first step, an organic hydroxyl-containing material (HCM) containing from 1 to about 200 hydroxyl groups with a first oxirane monomer selected from the group consisting of an acyclic glycidyl ether, a cyclic glycidyl ether, and a haloalkyl epoxide, in the presence of a catalytic amount of a catalyst selected from the group consisting of an $HMF_6$ acid, and, an oxonium salt of the $HMF_6$ acid, wherein M is an element selected from the group consisting of phosphorus, arsenic and antimony, and, (ii) polymerizing, in a second step, the polymer from said first step with a second oxirane monomer, different from said first oxirane monomer, also selected from the group consisting of an acyclic glycidyl ether, a cyclic glycidyl ether, and a haloalkyl epoxide, in the presence of a catalytic amount of said catalyst, such that, in each said step, the resulting polymer formed in said step is essentially directly proportional to the conversion of the monomer to said resulting polymer.

17. The process of claim 16 wherein said acyclic glycidyl ether is selected from the group consisting of alkyl glycidyl ether, haloalkyl glycidyl ether, phenoxyalkyl glycidyl ether, and halophenoxyalkyl glycidyl ether.

18. The process of claim 16 wherein said cyclic glycidyl ether is selected from the group consisting of cycloaliphatic glycidyl ethers, phenyl glycidyl ether, halophenyl glycidyl ether, alkylphenyl glycidyl ether, alkenyl glycidyl ether, and haloalkenyl glycidyl ether.

19. The process of claim 16 wherein said haloalkyl epoxide contains from 3 to about 8 carbon atoms and is selected from the group consisting of epichlorohydrin, epibromohydrin, 1-chloro-2,3-epoxybutane, 3-chloro-4,5-epoxyoctane, 1-chloro-2,3-epoxycyclohexane, 1-bromo-2,3-epoxy-3-methylbutane, and 2-chloro-2-methyl-3,4-epoxypentane.

20. The process of claim 16 wherein said acid is $HPF_6$.

21. The process of claim 16 wherein said acid is $HSbF_6$.

22. The process of claim 16 wherein said HCM is partially soluble in the reaction mass.

23. The process of claim 16 wherein said polymerization is effected in the presence of sufficient solvent for said HCM to maintain the reaction mass in a single phase.

24. The process of claim 16 wherein polymerization is effected at a temperature in the range from about 0° C. to about 110° C.

25. The process of claim 16 wherein said HCM is selected from the group consisting of a lower alkanol having from 1 to about 6 carbon atoms, an alkylene diol having from 2 to about 8 carbon atoms, poly(tetramethylene ether) glycol, an alkane polyol having from 5 to about 200 hydroxyl groups, poly(vinylbutyral), a copolymer of styrene-allyl alcohol, and a copolymer of ethylene-vinyl alcohol.

26. A process for preparing a block copolymer having at least one polyglycidyl ether block, said block copolymer having the structure

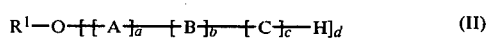

(II)

which process comprises polymerizing (i) a hydroxyl-containing organic material with (ii) a first glycidyl ether
A having the structure

wherein each R is independently selected from the group consisting of hydrogen, alkyl, haloalkyl, oxyalkylene, oxyhaloalkylene, alkoxyalkyl, aryl (Ar) and substituted aryl (Ar—Q), wherein Q is selected from the group consisting of alkyl, haloalkyl each having from 1 to about 10 carbon atoms, alkenyl and haloalkenyl each having from 2 to about 10 carbon atoms; and, unsaturated hydrocarbyl radicals;

B represents a second glycidyl ether having different substituents from those in said first glycidyl ether but also having structure (I);

C represents a haloalkyl epoxide;

when $R^1$ is a polyglycidyl ether residue,
 (i) at least one of A or B, and C is present;
 (ii) at least two glycidyl ethers arbitrarily selected from A and B are present; and,
 (iii) when C is present, at least one of A or B is present;

so that the molecular weight of the resulting block copolymer is directly proportional to the amount of monomer converted; and, a, b, and c represent integers in the range from about 5 to about 100;

D represents an integer in the range from 1 to about 200; so that the molecular weight of each of the segments of the copolymer is in the range from about 500 to about 10,000, the segments are present in a heterogenous relative order, and the molecular weight of the block copolymer is in the range from about 1000 to about 2,000,000.

27. The process of claim 26 wherein said block copolymer includes at least one segment which contains a reactive halogen capable of an addition reaction with an amine, and, optionally, $R^1$ of said block copolymer contains a reactive halogen capable of an addition reaction with an amine, so as to have formed a halogen-containing block copolymer, said process including, in addition, contacting said halogen-containing block copolymer with a preselected amount of an amine sufficient to aminate a preselected amount of said reactive halogen, optionally in the presence of a solvent for said amine and said halogen-containing block copolymer, at a temperature in the range from about 40° C. to about 110° C., and a pressure in the range from about 50 to about 500 psig.

28. The process of claim 26 wherein said halogen-containing block copolymer includes segment C and said amine is a lower alkylamine having from 1 to about 6 carbon atoms.

29. The process of claim 28 wherein said $R^1$ is selected from the group consisting of poly(butadiene)diol, poly(tetrahydrofuran)glycol and poly(styrene-co-butadiene)diol; segment A is selected from the group consisting of allyl glycidyl ether, phenyl glycidyl ether, and a lower alkyl glycidyl ether having from 1 to about 6 carbon atoms.

* * * * *